(12) United States Patent
Liu et al.

(10) Patent No.: US 10,592,540 B2
(45) Date of Patent: Mar. 17, 2020

(54) GENERATING ELEMENTS OF ANSWER-SEEKING QUERIES AND ELEMENTS OF ANSWERS

(71) Applicant: Google LLC, Mountain View, CA (US)

(72) Inventors: Yi Liu, Mountain View, CA (US); Preyas Popat, Mountain View, CA (US); Nitin Gupta, Santa Clara, CA (US); Afroz Mohiuddin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 782 days.

(21) Appl. No.: 15/195,364

(22) Filed: Jun. 28, 2016

(65) Prior Publication Data

US 2017/0011116 A1    Jan. 12, 2017

Related U.S. Application Data

(60) Provisional application No. 62/189,631, filed on Jul. 7, 2015.

(51) Int. Cl.
*G06F 16/00* (2019.01)
*G06F 16/33* (2019.01)
*G06F 16/35* (2019.01)
*G06F 16/332* (2019.01)

(52) U.S. Cl.
CPC ...... *G06F 16/3334* (2019.01); *G06F 16/3329* (2019.01); *G06F 16/35* (2019.01)

(58) Field of Classification Search
CPC ... G06F 16/3334; G06F 16/25; G06F 16/3329
USPC .......................................................... 707/728
See application file for complete search history.

(56) References Cited

U.S. PATENT DOCUMENTS

| 7,739,215 | B2 | 6/2010 | Horvitz et al. |
| 7,792,850 | B1* | 9/2010 | Raffill ................. G06F 7/02 707/758 |
| 7,805,303 | B2 | 9/2010 | Sugihara et al. |
| 7,937,265 | B1* | 5/2011 | Pasca ............. G06F 17/2775 704/1 |
| 8,423,350 | B1* | 4/2013 | Chandra ............... G06F 16/31 704/9 |

(Continued)

OTHER PUBLICATIONS

Cohen et al., MAD Skills: New Analysis Practices for Big Data, VLDB '09, Aug. 24-28, 2009, pp. 1481-1492.*

*Primary Examiner* — Monica M Pyo
(74) *Attorney, Agent, or Firm* — Fish & Richardson P.C.

(57) ABSTRACT

Methods, systems, and apparatus, including computer programs encoded on computer storage media, for generating answers to answer-seeking queries. One of the methods includes receiving a query having multiple terms. The query is classified as an answer-seeking query of a particular question type, and one or more answer types associated with the particular question type are obtained. Search results satisfying the query are obtained, and a respective score is computed for each of one or more passages of text occurring in each document identified by the search results, wherein the score for each passage of text is based on how many of the one or more answer types match the passage of text. A presentation that includes information from one or more of the passages of text selected based on the respective score is provided in response to the query.

25 Claims, 4 Drawing Sheets

(56) References Cited

U.S. PATENT DOCUMENTS

| | | | |
|---|---|---|---|
| 8,452,795 B1* | 5/2013 | Finkelstein | G06F 16/2423 |
| | | | 707/767 |
| 8,600,986 B2 | 12/2013 | Fan et al. | |
| 9,047,271 B1* | 6/2015 | Mengibar | G06F 17/2765 |
| 9,053,425 B2 | 6/2015 | Barborak et al. | |
| 9,940,367 B1* | 4/2018 | Baker | G06F 16/9535 |
| 10,180,964 B1* | 1/2019 | Baker | G06F 16/24575 |
| 2014/0046756 A1* | 2/2014 | Wang | G06Q 30/0251 |
| | | | 705/14.45 |
| 2015/0026169 A1 | 1/2015 | Brown et al. | |

* cited by examiner

GENERATING ELEMENTS OF ANSWER-SEEKING QUERIES AND ELEMENTS OF ANSWERS

CROSS REFERENCE TO RELATED APPLICATIONS

This application is a non-provisional of and claims priority to U.S. Provisional Patent Application No. 62/189,631, filed on Jul. 7, 2015, the entire contents of which are hereby incorporated by reference.

BACKGROUND

This specification relates to Internet search engines.

Internet search engines aim to identify resources, e.g., web pages, images, text documents, multimedia content, e.g., videos, that are relevant to a user's information needs and to present information about the resources in a manner that is most useful to the user. Internet search engines generally return a set of search results, each identifying a respective resource or otherwise providing a particular type of information, in response to a user submitted query.

In general, a search system receives a search query and obtains search results that satisfy the search query. The search results identify resources that are relevant or responsive to the search query, e.g., Internet accessible resources. A search system can identify many different types of search results in response to a received search query, e.g., search results that identify web pages, images, videos, books, or news articles, search results that present driving directions, in addition to many other types of search results.

Search systems may make use of various subsystems to obtain resources relevant to a query. For example, a search system can maintain a knowledge base that stores information about various entities and provide information about the entities when a search query references the alias of an entity. The system can assign one or more text string aliases to each entity. For example, the Statue of Liberty can be associated with aliases "the Statue of Liberty" and "Lady Liberty." Aliases need not be unique among entities. For example, "jaguar" can be an alias both for an animal and for a car manufacturer.

Another example search subsystem is a part-of-speech tagger. The part-of-speech tagger analyzes terms in a query and classifies each term as a particular part of speech, e.g., a noun, verb, or direct object. Another example search subsystem is a root word identifier. Given a particular query, the root wood identifier can classify a term in the query as a root word, which is a word that does not depend on any other words in the query. For example, in the query "how to cook lasagna," a root word identifier can determine that "cook" is the root word of the query.

SUMMARY

This specification describes how a search system can learn the characteristic elements of answer-seeking queries and answers to answer-seeking queries. When the search system receives a query having elements that are characteristic of an answer-seeking query, the search system can identify a corresponding answer that has characteristic elements of an answer to an answer-seeking query. The search system can then generate a presentation that prominently displays an answer to the answer-seeking query.

In general, one innovative aspect of the subject matter described in this specification can be embodied in methods that include the actions of receiving a query having multiple terms; classifying the query as an answer-seeking query of a particular question type; obtaining one or more answer types associated with the particular question type, wherein each answer type specifies one or more respective answer elements that represent characteristics of a proper answer to the answer-seeking query; obtaining search results satisfying the query, wherein each search result identifies a document; computing a respective score for each of one or more passages of text occurring in each document identified by the search results, wherein the score for each passage of text is based on how many of the one or more answer types match the passage of text; and providing, in response to the query, a presentation that includes information from one or more of the passages of text selected based on the respective score. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Providing the presentation comprises providing a presentation comprising the first passage of text and one or more search results satisfying the query. The actions include determining that the one or more passages of text have respective scores that satisfy a threshold; and in response, selecting the one or more passages of text having respective scores that satisfy the threshold for inclusion in the presentation. Classifying the query as an answer-seeking query of a particular type comprises: matching the terms of the query against a plurality of question types, wherein each question type specifies a respective plurality of question elements that collectively represent characteristics of a corresponding type of query; and determining that the terms of the query match a first question type of the plurality of question types. Determining that the terms of the query match the particular question type comprises: determining that a first n-gram in the query represents an entity instance; and determining that the first question type includes a question element representing the entity instance. Determining that the terms of the query match the particular question type comprises: determining that a first n-gram in the query represents an instance of a class; and determining that the question type includes a question element representing the class. The actions include determining that a first passage of text matches a first answer type of the one or more answer types, including determining that the first passage of text has one or more n-grams that respectively match one or more answer elements of the first answer type. A first answer element of the one or more answer elements represents a numerical measurement, and wherein determining that the first passage of text matches the first answer type comprises determining that the first passage of text has an n-gram that represents a numerical measurement. The first answer element of the one or more answer elements represents a verb class, and wherein determining that the first passage of text matches the first answer type comprises determining that the first passage of text has an n-gram that represents an instance of the verb class. The first answer element of the one or more answer elements represents an instance of a first n-gram occurring no more than a threshold number of terms away from a second n-gram that represents an entity, and wherein determining that the first passage of text matches the first answer type comprises determining that the first passage of text has an instance of the first n-gram occurring within a threshold number of terms of a third n-gram that represents the entity. A first answer element of the one or more answer elements represents a first n-gram occurring no more than a threshold number of terms away from a second n-gram, and wherein determining that the first passage of text matches the first answer type comprises determining that the first passage of text has an instance of the first n-gram occurring no more than the threshold number of terms away from the second n-gram. Computing a respective score for each of one or more passages of text occurring in each document identified by the search results comprises: computing, for each passage of text, a score representing how many of the one or more answer types match the passage of text. Computing a respective score for passages of text occurring in each document identified by the search results comprises: aggregating respective scores associated with the one or more answer types that match the passage of text. The actions include receiving a question from a collection of training data; determining matching n-grams in the question, wherein each matching n-gram matches a question element type of a plurality of question element types; and generating a plurality of question types including generating, for each matching n-gram, a question element according to the matching question element type. The actions include determining that a first matching n-gram represents an entity instance; and generating a question type having a question element representing the entity instance. The actions include determining that a first matching n-gram represents an instance of a class; and generating a question type having a question element representing the class. The class represents an entity class or a part-of-speech class. The actions include computing a respective count for each question type of the plurality of question types, wherein the count represents how many questions in the training data had terms matching question elements of the question type; computing a respective score for each question type based on the count for the question type; and ranking the question types by the respective scores for the question types, wherein the plurality of question types are a plurality of highest-ranked question types matching the query. Obtaining one or more answer types associated with the question type comprises: obtaining, from an index mapping question types to answer types, the one or more answer types associated with the question type. The actions include receiving an answer from a collection of training data; determining matching n-grams in the answer, wherein each matching n-gram matches an answer element type of a plurality of answer element types; and generating a plurality of answer types including generating, for each matching n-gram, an answer element according to the matching answer element type. The actions include determining that a first matching n-gram represents an instance of a numerical measurement; and generating an answer type having a answer element representing the numerical measurement. The actions include determining that a first matching n-gram represents an instance of a verb class; and generating an answer type having an answer element representing the verb class. The actions include determining that a first matching n-gram represents an instance of a first n-gram occurring no more than a threshold number of terms away from a second n-gram that represents an entity; and generating an answer type having an answer element representing the first n-gram occurring no more than a threshold number of terms away from an n-gram that represents the entity. The actions include determining that a first matching n-gram represents an instance of a first n-gram occurring no more than a threshold number of terms away from a second n-gram; and generating an answer type having an answer element representing the first n-gram occurring no more than the threshold number of terms away from the second n-gram.

Particular embodiments of the subject matter described in this specification can be implemented so as to realize one or more of the following advantages. From a relatively small set of question element types and answer element types, a system can automatically discover thousands or millions of question types and answer types at varying levels of generality. A search system can provide accurate answers to answer-seeking queries with high reliability.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies relating to classifying queries as answer-seeking and generating answers to answer-seeking queries. An answer-seeking query is a query issued by a user who seeks a concise answer. For example, "when was george washington born" would be classified by a system as an answer-seeking query because the system can determine that it is likely that a user who issues it seeks a concise answer, e.g., "Feb. 22, 1732."

Not all queries are answer-seeking. For example, a search system may not consider a query to be answer-seeking when the query seeks an identification of multiple documents that are relevant to the query. For example, a search system would not consider "restaurants in new york" to be an answer-seeking query because a user who issues it does not expect a concise answer, as no concise answer exists.

The techniques described below relate both to how a system can classify a query as an answer-seeking query and how a system can identify portions of responsive documents that are likely to be good answers to an answer-seeking query.

Figure 1:
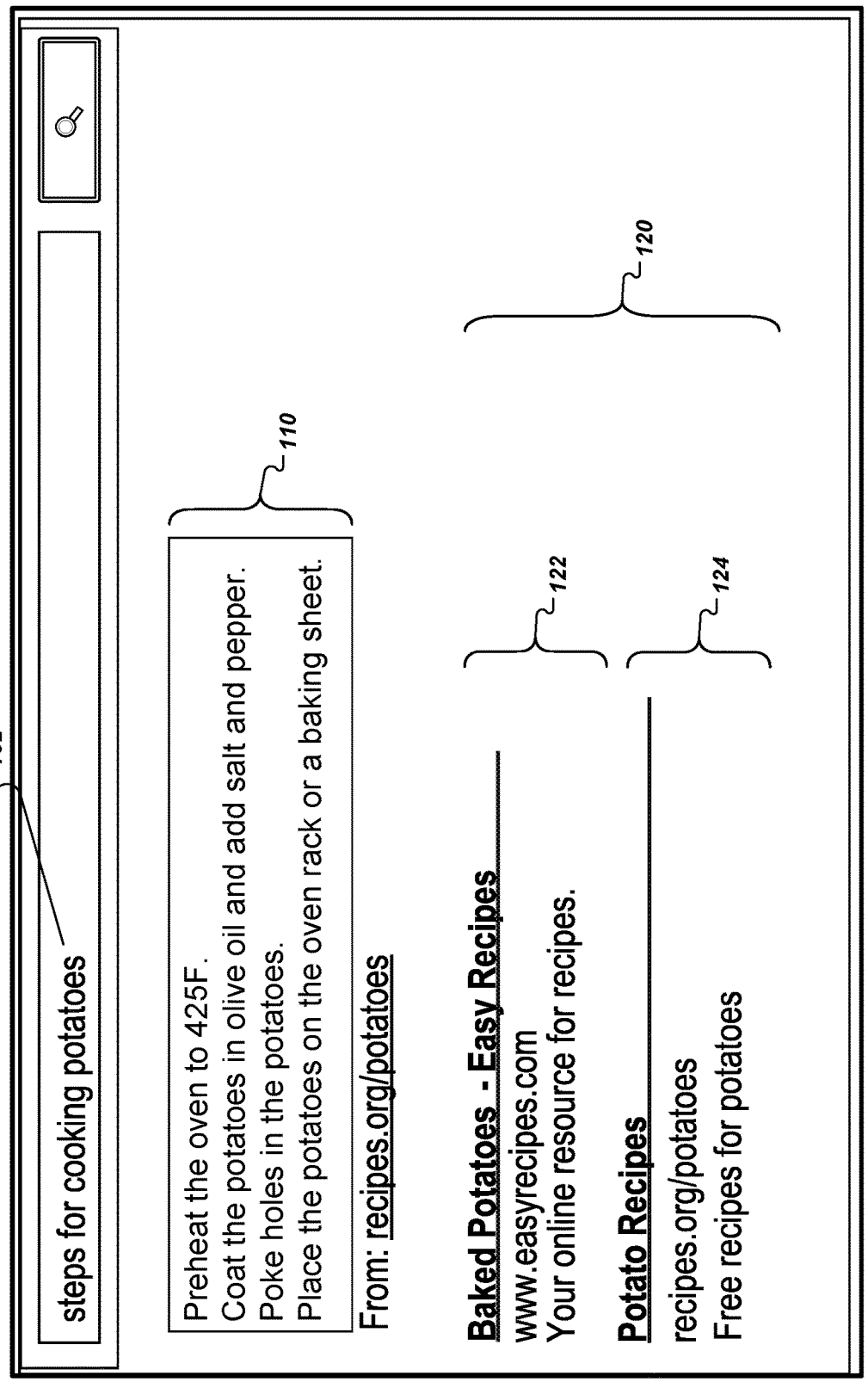
FIG. 1 illustrates an example presentation of an answer to an answer-seeking query.

FIG. 1 illustrates an example presentation of an answer to an answer-seeking query. A user can submit a query 102 to a search system through a graphical user interface of a web browser or through a user interface of another software application installed on a user device, e.g., a mobile application installed on a mobile computing device.

In response to receiving the query 102, the search system can provide a search results page 100 in a format that can be presented on the user device. For example, the search results page 100 can be provided as a markup language document, e.g., a HyperText Markup Language document, and the user device can render the document, e.g., using a web browser, in order to present the search results page 100 on a display of the user device.

The search results page 100 includes web search results 122 and 124 as well as an answer box 110. The web search results 122 and 124 can be obtained by the search system from an indexed collection of web resources. Each of the web search results 122 and 124 includes a title, a snippet, and a display link. User selection of a web search result can cause the web browser or other software application to navigate to a site that hosts the web page resource identified by the corresponding web search result.

The answer box 110 includes an answer to the query. The answer can be obtained from text of documents referenced by the web search results 120. In this example, the answer in the answer box 110 is obtained from text of a document referenced by the second search result 124.

The search system can provide the answer box 110 whenever the system decides that the query is an answer-seeking query. A search system may consider a query to be an answer-seeking query because its terms match a predetermined question type. However, the query need not be expressed in the form of a question, and the query need not include a question word, e.g., "how," "why," etc.

In this example, the search system provides the answer box 110 in response to the query 102 even though the query 102 is not phrased as a question and even though the query 102 does not include a question word.

A search system can determine that a passage of text in a document referenced by a search result is likely to be a good answer because the text of the passage matches an answer type associated with the determined question type. In this example the answer box 110 is identified as a good answer to the query 102 even though the answer does not include the term "cooking," which occurred in the query 102, and even though the answer does not occur in a document referenced by a highest-ranked search result.

Rather, the answer in the answer box 110 is identified as a good answer because the search system has determined that the question type matching the query is often associated with an answer type that matches text of the document referenced by the search result 124.

Figure 2:
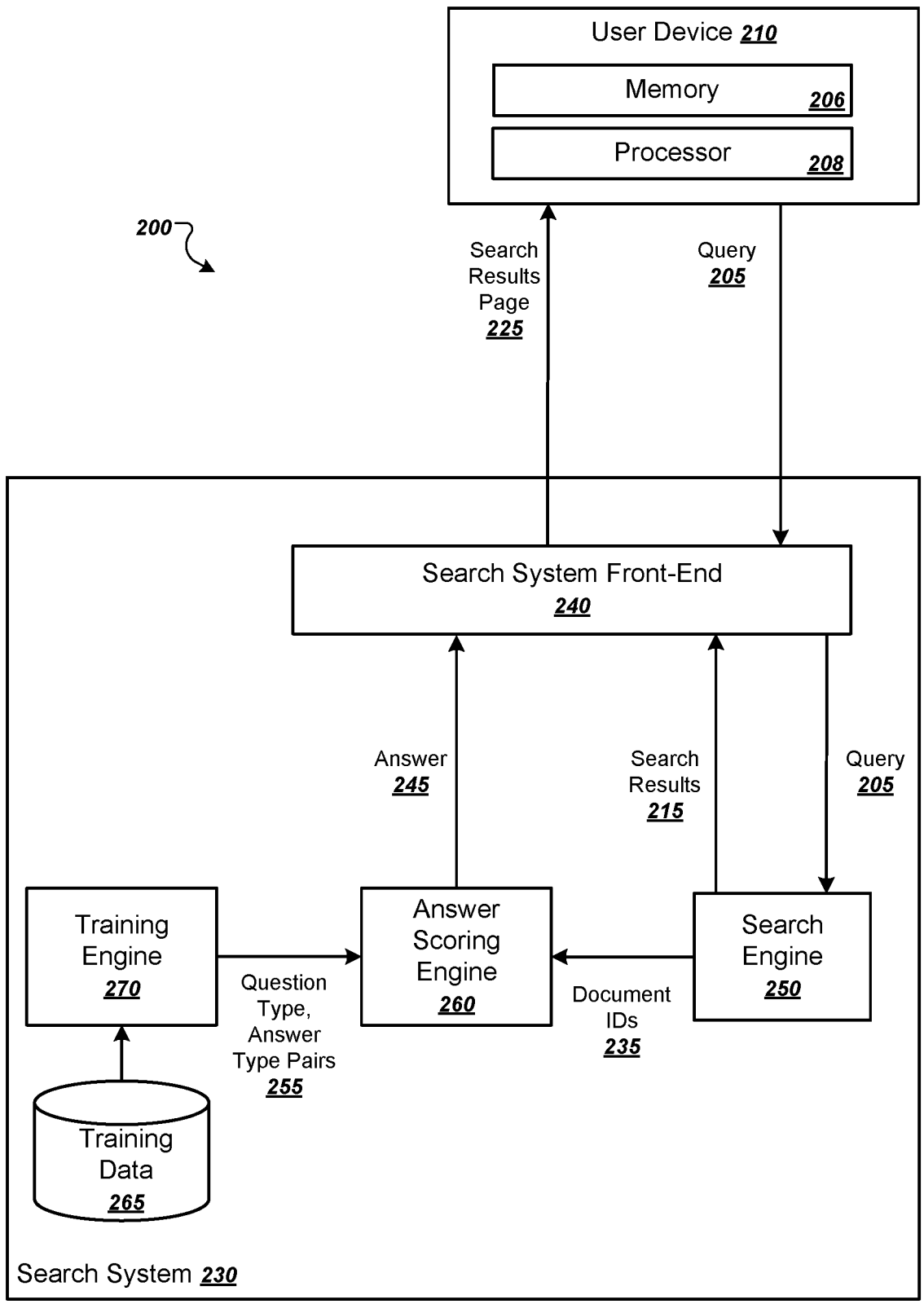
FIG. 2 is a diagram of an example system

FIG. 2 is a diagram of an example system 200. In general, the system includes a user device 210 coupled to a search system 230. The search system 230 is an example of an information retrieval system in which the systems, components, and techniques described below can be implemented.

In operation, the user device 210 transmits a query 205 to the search system 230 over a network, e.g., the Internet. The query 205 includes one or more terms and can include other information, for example, a location of the user device 210. The search system 230 identifies search results 205 that satisfy the query 205 and generates a response, generally in the form of a search results page 225. The search system 230 transmits the search results page 225 back to the user device 210 for presentation to a user. Generally, the user is a person; but in certain cases, the user can be a software agent.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 208 for executing program instructions and memory 206, e.g., random access memory (RAM). The user device 210 can include computer readable media that store software applications, e.g., a browser or layout engine, an input device, e.g., a keyboard or mouse, a communication interface, and a display device.

The user device 210 and the search system 230 can communicate over any appropriate network, for example, a wireless cellular network, a wireless local area network (WLAN) or Wi-Fi network, a Third Generation (3G), Fourth Generation (4G), or other telecommunications network, a wired Ethernet network, a private network such as an intranet, a public network such as the Internet, or any appropriate combination of such networks.

The search system 230 can be implemented as computer programs installed on one or more computers in one or more locations that are coupled to each through a network. The search system 230 includes a search system front end 240, search engine 250, an answer scoring engine 260, and a training engine 270.

In general, the search system front end 240 receives the query 205 from the user device 210 and routes the query 205 to the search engine 250. The search system front end 240 also provides the resulting search results page 225 to the user device 210. In doing so, the search system front end 240 acts as a gateway, or interface, between user devices and the search system 230.

The answer scoring engine 260 receives document IDs 235 from the search engine 250 and generates an answer 245 to be included in the search results page 225. The document IDs identify a subset of documents referenced by the search results 215. For example, the document IDs 235 can specific a network location of a document or a location in an internal collection of documents stored by the search system 230.

The answer scoring engine 260 generates the answer using question type/answer type pairs 255 received from the training engine 270. The answer scoring engine 260 can identify for the query 205 one or more question types matching the terms of the query, and for each question type, one or more answer types associated with the question element.

Each question type specifies one or more question elements that are characteristic of an answer-seeking query. Similarly, each corresponding answer type specifies one or more answer elements that are characteristic of an answer to an answer-seeking query. Question types and answer types will be described in more detail below with reference to FIG. 3.

The training engine 270 identifies pairs of question types and answer types. The training engine 270 processes training examples in a collection of training data 265, which can include pairs of questions and answers to the questions.

Figure 3:
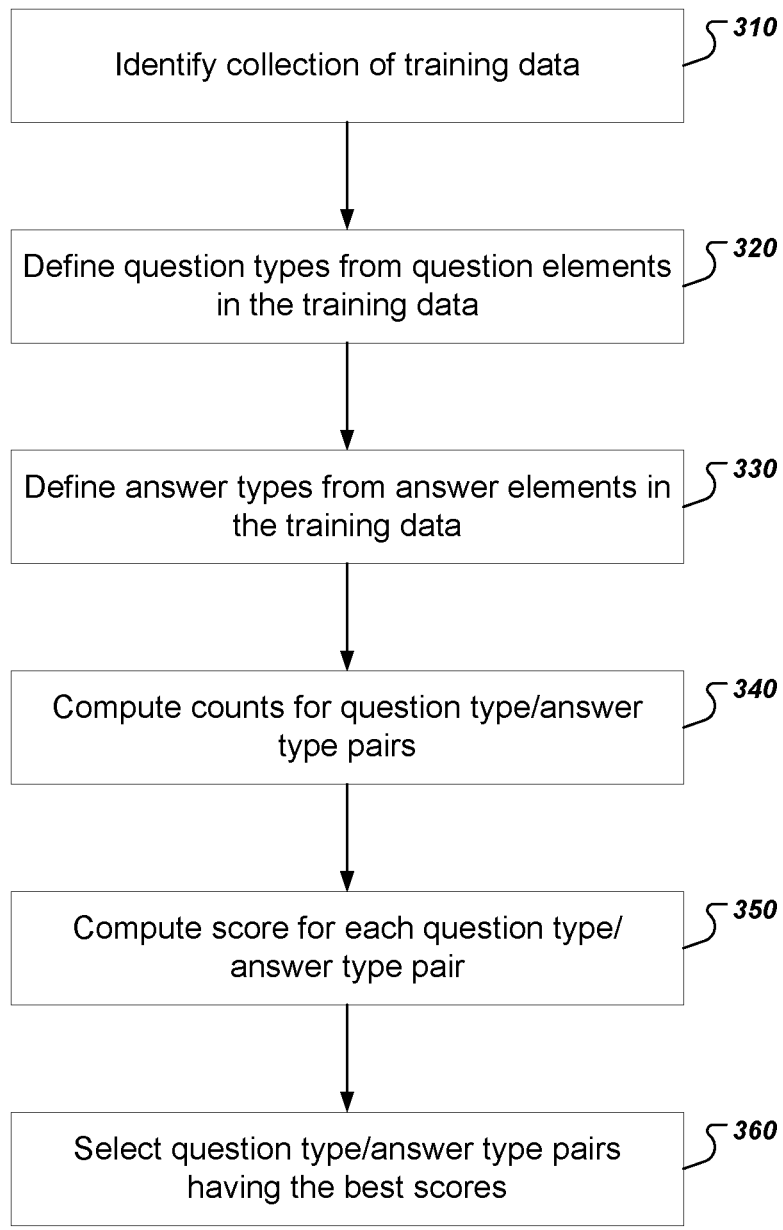
FIG. 3 is a flow chart of an example process for generating question element/answer element pairs.

FIG. 3 is a flow chart of an example process for generating question element/answer element pairs. The system processes question/answer pairs in training data to define question types and corresponding answer types. The system then computes statistics representing which question type/answer type pairs are most likely to generate good answers for answer-seeking queries. The process can be implemented by one or more computer programs installed on one or more computers. The process will be described as being performed by an appropriately programmed system of one or more computers, e.g., the training engine 270.

The system identifies a collection of training data (310). In general, the training data includes data that associates questions with answers. For example, the training data can include examples that are question and answer pairs. The training data can also include, as the questions, queries that were determined to be answer-seeking and, as the answers, snippets of search results that were selected by users, either in general or selected more frequently than other search results.

In some implementations, the system first filters certain types of words and phrases out of questions in the training data. For example, the system can remove stop words from the question. Thus, the system may filter stop words out of the question "how to cook lasagna" to generate "how cook lasagna." As another example, the system can remove some parts of speech from the question. For example, the system can remove adjectives and prepositional phrases from the query. Thus, the system may filter adjectives and prepositional phrases from the question "where is the esophagus located in the human body" to generate "where is esophagus located."

The system can also transform terms in the questions and answers into canonical forms. For example, the system can transform inflected forms of the term "cook," e.g., "cooking," "cooked," "cooks," and so on, into the canonical form "cook."

The system defines question types from question elements in the training data (320). A question type is a group of question elements that collectively represent the characteristics of an answer-seeking query.

For example, the question type (how, cook) specifies two question elements, "how," and "cook." A query matches this question type when it has terms matching all of the question elements in the question type. For example, the query "how to cook pizza" matches the question type (how, cook) because the query includes all question elements of the question type.

Question types can be ordered or unordered. Question types that impose an ordering may be denoted with curly braces. Thus, a query will match the question type {how, cook} if and only if the term "how" occurs in the query before the term "cook."

The system can generate question types by processing questions in the training data and determining, for each question, which terms of the question match any of set of question element types. Each question element type represents a characteristic of an n-gram occurring in a question. The system generates question types by instantiating question elements corresponding to the matching question element types.

Some common question element types, and their corresponding instantiated question elements, include:

<entity instance>—The entity instance type matches n-grams that represent entity instances. For example, the n-gram "Abraham Lincoln" matches this question element type because this n-gram is an instance of an entity. When an n-gram matches this question element type, the resulting question type includes a question element representing the entity instance of the n-gram, e.g., (entity/Abraham_Lincoln). Other n-grams that match any aliases of the same entity will match this question element, e.g., "Abe Lincoln," "President Lincoln," and "Honest Abe."

<entity class>—The entity class type matches n-grams that represent instances of entity classes. For example, the n-gram "lasagna" matches this question element type because it is an instance of an entity class representing food dishes. When an n-gram matches this question element type, the resulting question type includes a question element representing the entity class, e.g., (entity/dishes)

<part of speech class>—The part-of-speech class type matches n-grams that represent instances of part-of-speech classes. For example, the n-gram "run" matches this question element type because it is an instance of a part-of-speech class "verbs." When an n-gram matches this question element type, the resulting question type includes a question element representing the matching part-of-speech class, e.g., (part-of-speech/verb).

<root word>—The root word type matches n-grams that the system determines to be the root word of a question. In general, a root word is term that does not depend on other terms in the question. For example, in "how to cook lasagna," "cook" is the root word. Thus, "cook" would match this question element type when "cook" occurs in the query "how to cook lasagna." The resulting question type includes the matching n-gram, e.g., (cook).

<n-gram>—The n-gram type matches any n-gram. However, to avoid overly voluminous generation of question types from the training data, the system can restrict n-gram question elements to a predefined set of n-grams. In some implementations, the system predefines n-gram question elements to include question words and phrases, e.g., "how," "how to," "when," "when was," "why," "where," "what," "who", and "whom," to name just a few examples.

Each n-gram in a question can match multiple question element types. For example, the n-gram "George Washington" matches both the entity instance type, resulting in the question element entities/George_Washington, as well as the entity class type, resulting in the question element entities/us_presidents. The n-gram "George Washington" may also match the n-gram type depending on how the system limits the number of n-gram types. The term "cook" matches the root word type, the entity instance type, and the entity class type.

After identifying the matching question element types, the system can then generate question types by generating different combinations of question elements at varying lengths and at multiple levels of generality. This allows the system to discover question types that provide a good balance between generality and specificity. For example, consider the question "how to cook lasagna." The first term "how" matches only the n-gram element type. However, "cook" matches the n-gram element type, the root word element type, and the entity class element type for the class "hobbies."

Thus, the system can generate the following two-element question types by selecting different combinations of matching question elements:

(how, cook)
(how, entity/hobbies)

The term "lasagna" matches the n-gram element type and the entity class element type "dishes." Thus, the system can generate the following three-element question types by selecting different combinations of matching question elements:

(how, cook, lasagna)
(how, cook, entity/dishes)
(how, entity/hobbies, entity/dishes)
(how, entity/hobbies, lasagna)

In general, the system selects, for each generated question type, no more than one question element for each n-gram the question element matches in the query. In other words, the terms in the query that match the question elements do not match multiple question elements selected for the newly defined question type. For example, the system generates (how, cook, lasagna) but not (how, lasagna, entity/dishes). This is because in (how, lasagna, entity/dishes), the term "lasagna" would match multiple question elements.

In some implementations, the system does not generate question types that merely repeat the question. For example, the system can discard (how cook lasagna) as a question type because it is merely a recitation of the original question.

The system defines answer types from answer elements in the training data (330). An answer type is a group of answer elements that collectively represent the characteristics of a proper answer to an answer-seeking query.

The system can generate answer types by processing answers in the training data and determining, for each answer, which terms of the answer match any of a set of answer element types. Each answer element type represents a characteristic of an n-gram occurring in an answer. The system generates answer types by instantiating answer elements corresponding to the matching answer element types.

Some common answer element types, and their corresponding instantiated answer elements, include:

<measurement>—The measure type matches terms that represent numerical measurements. These can include dates, e.g., "1997," "Feb. 2, 1997," or "2/19/1997," physical measurements, e.g., "1.85 cm," "12 inches," time durations, "10 minutes," "1 hour," or any other appropriate numerical measurement.

<n-gram>—The n-gram type matches any n-gram in an answer. To avoid overly voluminous generation of answer types, the system can restrict n-gram answer elements to n-grams below a certain value of n and that are not common. For example, the system can restrict n-gram answer elements to 1-grams and 2-grams having an inverse document frequency score that satisfies a threshold.

<verb>—The verb type matches any terms that the system determines to be verbs.

<preposition>—The preposition types matches any terms that the system determines to be prepositions. In general, a system can define answer element types for any part-of-speech. However, in some implementations, the system uses only verb and preposition types.

<entity_instance>—The entity instance type matches n-grams that represent entity instances. The resulting answer type includes an answer element representing the entity instance, e.g., (entity/Abraham_Lincoln).

<n-gram near entity>—The n-gram-near-entity type uses both the n-gram answer element type and the entity instance answer element type and also imposes a restriction that the n-gram occur near the entity instance in an answer. The system can consider an n-gram to be near an entity instance when the n-gram occurs in the answer within a threshold number of terms of the entity instance, occurs in the same sentence as the entity instance, or occurs in the same passage as the entity instance. For example, in the answer "Obama was born in Honolulu," the uncommon n-gram "Honolulu" occurs within five terms of the entity instance "Obama. The resulting answer type includes the n-gram and the entity instance, e.g., (entity/Obama near Honolulu)

<verb near entity>—the verb-near-entity type uses both the verb answer element type and the entity instance answer element type and similarly imposes a restriction that the verb occur near the entity instance in an answer. For example, for "Obama was born in Honolulu," the resulting answer type can include the answer element (entity/Obama near born).

<preposition near entity>—The preposition-near-entity type uses both the preposition answer element type and the entity instance answer element type and similarly imposes a restriction that the preposition occur near the entity instance in the answer. For example, for "Obama was born in Honolulu," the resulting answer type can include the answer element (entity/Obama near in)

<verb class>—The verb class type matches n-grams that represent instances of verb classes. For example, the system can identify all of the following verbs as instances of the class verb/blend: add, blend, combine, commingle, connect, cream, fuse, join, link, merge, mingle, mix, network, pool. The resulting answer type includes a question element representing the verb class, e.g., (verb/blend).

<skip grams>—The skip gram type specifies a bigram as well as a number of terms occur between the terms of the bigram. For example, if the skip value is 1, the skip gram "where * the" matches all of the following n-grams: "where is the," "where was the," "where does the," and "where has the." The resulting answer type includes an answer element representing the bigram and the skip value, e.g., (where * the), where the single asterisk represents a skip value of 1.

The system computes counts for question type/answer type pairs (340). As the system processes each training example in the training data, the system can define question types from the question and define answer types from the answer. The system can then generate pairs of question types and answer types from different combinations of the question types and answer types generated.

If a particular question type/answer type pair has not already been defined, the system can generate a new instance of the pair. If the pair has already been defined, the system can update counts associated with the pair and global counts representing a how many different pairs have been defined.

The system computes a score for each question type/answer type pair (350). In general, the system computes a score that represents the predictive quality of a particular question type/answer type pair as reflected by the training data. A question type/answer type pair with a good score is likely to have an answer type with one or more answer elements that collectively represent characteristics of a proper answer to an answer-seeking query represented by the question type. The system will typically wait until all the counts have been computed before computing a score for a particular question type/answer type pair.

In some implementations, the system computes a pointwise mutual information (PMI) score for each pair. A PMI score of zero indicates that the question and answer are independent and have no relation. A high score, on the other hand, represents a higher likelihood of finding the answer type matching answers to questions matching the corresponding question type.

The PMI score for a question type/answer type pair can be given by:

$$PMI = \log \frac{CR}{GR},$$

where CR represents the conditional rate of the answer type and GR represents the global rate of the answer type of the pair.

The system can compute the conditional rate according to:

$$CR(a) = \frac{QApairs(r)}{totalQApairs(q)},$$

where QApairs(r) represents how many times the question type/answer type pair occurred in the training data, and totalQApairs(q) represents how many times that the question type occurred in all pairs defined from the training data.

The system can compute the global rate according to:

$$GR(a) = \frac{QApairs(a)}{totalQApairs},$$

where totalQApairs represents how many defined pairs that occurred in the training data.

The system can alternatively use a normalized point-wise mutual information (NPMI) score. The NPMI has the benefit of being bounded between −1 and 1, but may be more susceptible to noise in the presence of sparse data.

The system can compute the NPMI score according to:

$$NPMI(q, a) = \frac{PMI(q, a)}{-\log P(q, a)},$$

where the term P(q,a) is computed as:

$$P(q, a) = \frac{QApairs(r)}{totalQApairs}.$$

The system selects question type/answer type pairs having the best scores (360). The system can rank the question type/answer type pairs and select pairs having a score that satisfies a threshold. Answer types of the selected pairs are likely to represent proper answers to answer-seeking queries represented by the corresponding question types.

The system can then index the selected question type/answer type pairs by question type so that the system can efficiently obtain all answer types associated with a particular question type during online scoring. In other words, the system associates each question type with a set of associated answer types as reflected by the selected pairs. The system can also sort the question type index by scores so to make real-time decisions about how many answer types to try. In other words, the system sorts each answer type associated with a question type by score so that the answer types having the highest scores can be processed first at query time.

Figure 4:
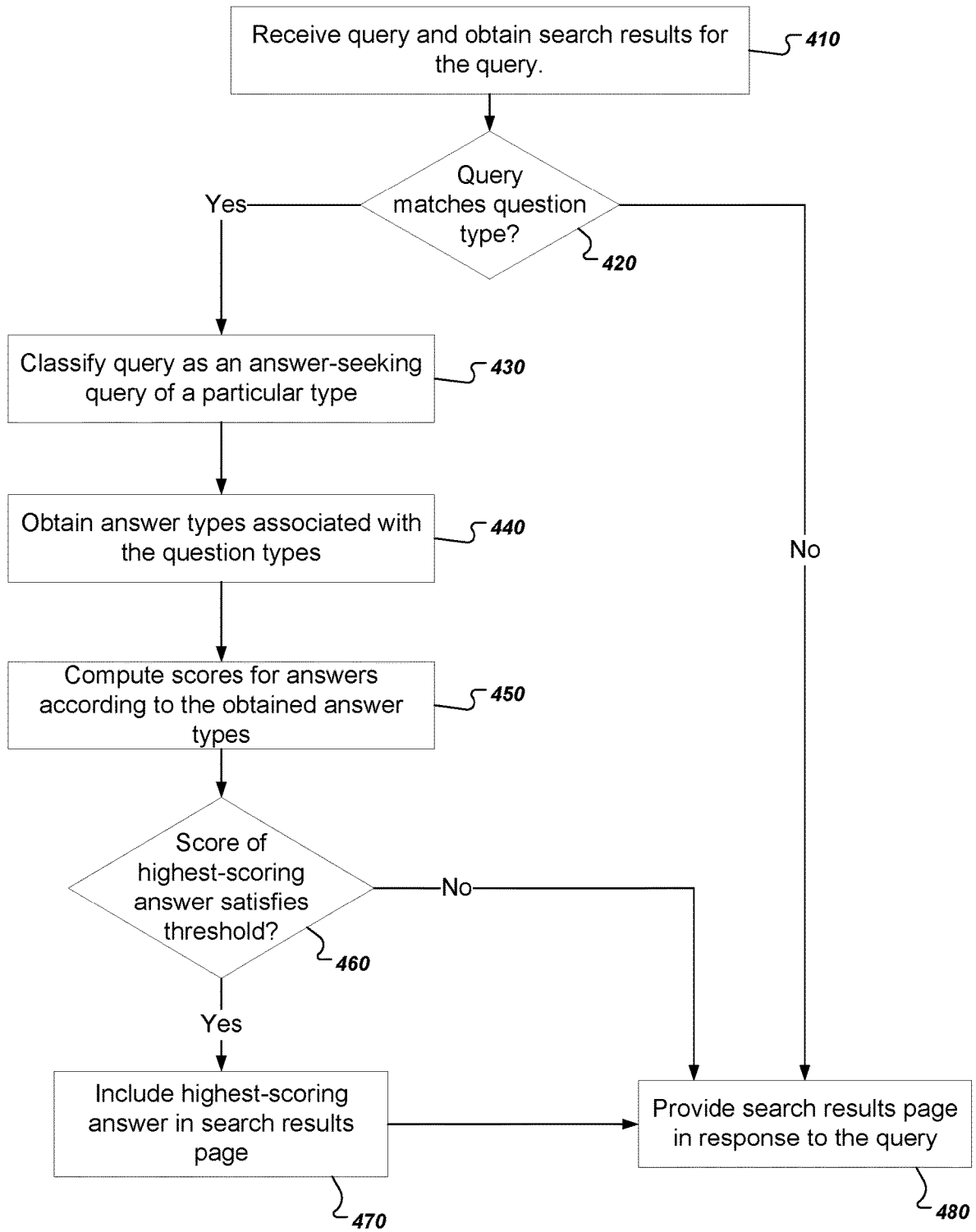
FIG. 4 is a flow chart of an example process for generating answers for answer-seeking queries.

FIG. 4 is a flow chart of an example process for generating answers for answer-seeking queries. For an answer-seeking query, the system determines a question type matching the query. The system then determines passages of text that match answer types associated with the question type. The process can be implemented by one or more computer programs installed on one or more computers. The process will be described as being performed by a system of one or more computers.

The system receives a query and obtains search results for the query (410). For example, the system can use a search engine to obtain search results for the query, as described above with reference to FIGS. 1-2.

The system determines whether the query matches a question type (420). If the query does not match any of the generated question types, the system can determine that the query is not an answer-seeking query. Thus, the system can merely provide the search results page in response to the query without obtaining an answer (branch to 480).

If the query does match at least one question type, the system classifies the query as an answer-seeking query of a particular type (branch to 430). The type of the answer-seeking query is defined by the elements of the matching question type. The system can then seek to obtain passages of text that are likely to be good answers to the answer-seeking query.

To do so, the system obtains the answer types associated with the matching question types (440). For example, the system can access a question type index as described above that associates each matching question type with one or more answer types.

The system computes scores for answers according to the obtained answer types (450). The system can iterate through passages of text in documents referenced by the obtained search results to determine whether any of the passages of text match the obtained answer types. If a passage of text matches an answer type, the system can consider the passage of text to be a candidate answer for the query.

The system can aggregate scores for passages of text that match multiple answer types. In some implementations, the system counts how many obtained answer types a particular passage of text matches.

The system can also aggregate scores associated with each matching answer type. For example, the system can aggregate the conditional rates associated with each matching answer type or the PMI or NPMI score associated with the corresponding question type/answer type pair.

The system determines whether the score of the highest-scoring answer satisfies a threshold (460). If the score does not satisfy a threshold, the system can determine that the answer is not a good answer to the query. Thus, the system can decline to include an answer when providing the search results page (branch to 480).

If the score does satisfy the threshold, the system can include the highest-scoring answer in the search results page (branch to 470), and then provide the search results page in response to the query (480).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a query having multiple terms;
classifying the query as an answer-seeking query of a particular question type;
obtaining one or more answer types associated with the particular question type, wherein each answer type specifies one or more respective answer elements that represent characteristics of an answer to the answer-seeking query;
obtaining search results for the query, wherein each search result identifies a document;
computing, for each passage of text of one or more passages of text occurring respectively in each document identified by the search results, a count of matching answer types of the one or more answer types associated with the particular question type, wherein an answer type is a matching answer type for a passage of text whenever one or more respective answer elements belonging to the answer type each occur in the passage of text;
computing a respective score for each passage of text of one or more passages of text occurring in each document identified by the search results, wherein the respective score for each passage of text is based on the respective computed count of matching answer types for the passage of text;
determining that a computed score for a first passage of text occurring in a first document identified by a first search result satisfies a threshold; and
in response, providing, in response to the query, a presentation that includes the first passage of text from the first document identified by the first search result.

2. The method of claim 1, wherein providing the presentation comprises providing a search results page comprising the first passage of text and one or more search results for the query.

3. The method of claim 1, wherein classifying the query as an answer-seeking query of a particular question type comprises:
matching the terms of the query against a plurality of question types, wherein each question type specifies a respective plurality of question elements that collectively represent characteristics of a corresponding type of query; and
determining that the terms of the query match a first question type of the plurality of question types.

4. The method of claim 1, wherein determining that the terms of the query match the particular question type comprises:

determining that a first n-gram in the query represents an entity instance; and
determining that the first question type includes a question element representing the entity instance.

5. The method of claim 1, wherein determining that the terms of the query match the particular question type comprises:
determining that a first n-gram in the query represents an instance of a class; and
determining that the question type includes a question element representing the class.

6. The method of claim 1, further comprising:
determining that the first passage of text matches a first answer type of the one or more answer types, including determining that the first passage of text has one or more n-grams that respectively match one or more answer elements of the first answer type.

7. The method of claim 6, wherein a first answer element of the one or more answer elements represents a numerical measurement, and
wherein determining that the first passage of text matches the first answer type comprises determining that the first passage of text has an n-gram that represents a numerical measurement.

8. The method of claim 6, wherein the first answer element of the one or more answer elements represents a verb class, and
wherein determining that the first passage of text matches the first answer type comprises determining that the first passage of text has an n-gram that represents an instance of the verb class.

9. The method of claim 6, wherein the first answer element of the one or more answer elements represents an instance of a first n-gram occurring no more than a threshold number of terms away from a second n-gram that represents an entity, and
wherein determining that the first passage of text matches the first answer type comprises determining that the first passage of text has an instance of the first n-gram occurring within a threshold number of terms of a third n-gram that represents the entity.

10. The method of claim 7, wherein determining that the first passage of text matches the first answer type comprises determining that an occurrence of a first n-gram of an answer element is no more than a threshold number of terms away from an occurrence of a second n-gram of the answer element.

11. The method of claim 1, wherein computing a respective score for each of one or more passages of text occurring in each document identified by the search results comprises:
computing, for each passage of text, a score representing how many of the one or more answer types match the passage of text.

12. The method of claim 1, wherein computing a respective score for passages of text occurring in each document identified by the search results comprises:
aggregating respective scores associated with the one or more answer types that match the passage of text.

13. A system comprising:
one or more computers and one or more storage devices storing instructions that are operable, when executed by the one or more computers, to cause the one or more computers to perform operations comprising:
receiving a query having multiple terms;
classifying the query as an answer-seeking query of a particular question type;

obtaining one or more answer types associated with the particular question type, wherein each answer type specifies one or more respective answer elements that represent characteristics of an answer to the answer-seeking query;

obtaining search results for the query, wherein each search result identifies a document;

computing, for each passage of text of one or more passages of text occurring respectively in each document identified by the search results, a count of matching answer types of the one or more answer types associated with the particular question type, wherein an answer type is a matching answer type for a passage of text whenever one or more respective answer elements belonging to the answer type each occur in the passage of text;

computing a respective score for each passage of text of one or more passages of text occurring in each document identified by the search results, wherein the respective score for each passage of text is based the respective computed count of matching answer types for the passage of text;

determining that a computed score for a first passage of text occurring in a first document identified by a first search result satisfies a threshold; and in response, providing, in response to the query, a presentation that includes the first passage of text from the first document identified by the first search result.

14. The system of claim 13, wherein providing the presentation comprises providing a search results page comprising the first passage of text and one or more search results for the query.

15. The system of claim 13, wherein classifying the query as an answer-seeking query of a particular question type comprises:

matching the terms of the query against a plurality of question types, wherein each question type specifies a respective plurality of question elements that collectively represent characteristics of a corresponding type of query; and determining that the terms of the query match a first question type of the plurality of question types.

16. The system of claim 13, wherein determining that the terms of the query match the particular question type comprises:

determining that a first n-gram in the query represents an entity instance; and determining that the first question type includes a question element representing the entity instance.

17. The system of claim 13, wherein determining that the terms of the query match the particular question type comprises:

determining that a first n-gram in the query represents an instance of a class; and determining that the question type includes a question element representing the class.

18. The system of claim 13, wherein the operations further comprise:

determining that a first passage of text matches a first answer type of the one or more answer types, including determining that the first passage of text has one or more n-grams that respectively match one or more answer elements of the first answer type.

19. The system of claim 18, wherein a first answer element of the one or more answer elements represents a numerical measurement, and wherein determining that the first passage of text matches the first answer type comprises determining that the first passage of text has an n-gram that represents a numerical measurement.

20. The system of claim 18, wherein the first answer element of the one or more answer elements represents a verb class, and wherein determining that the first passage of text matches the first answer type comprises determining that the first passage of text has an n-gram that represents an instance of the verb class.

21. The system of claim 18, wherein the first answer element of the one or more answer elements represents an instance of a first n-gram occurring no more than a threshold number of terms away from a second n-gram that represents an entity, and wherein determining that the first passage of text matches the first answer type comprises determining that the first passage of text has an instance of the first n-gram occurring within a threshold number of terms of a third n-gram that represents the entity.

22. The system of claim 18, wherein determining that the first passage of text matches the first answer type comprises determining that an occurrence of a first n-gram of an answer element is no more than a threshold number of terms away from an occurrence of a second n-gram of the answer element.

23. The system of claim 13, wherein computing a respective score for each of one or more passages of text occurring in each document identified by the search results comprises:

computing, for each passage of text, a score representing how many of the one or more answer types match the passage of text.

24. The system of claim 13, wherein computing a respective score for passages of text occurring in each document identified by the search results comprises:

aggregating respective scores associated with the one or more answer types that match the passage of text.

25. A computer program product, encoded on one or more non-transitory computer storage media, comprising instructions that when executed by one or more computers cause the one or more computers to perform operations comprising:

receiving a query having multiple terms;

classifying the query as an answer-seeking query of a particular question type;

obtaining one or more answer types associated with the particular question type, wherein each answer type specifies one or more respective answer elements that represent characteristics of an answer to the answer-seeking query;

obtaining search results for the query, wherein each search result identifies a document;

computing, for each passage of text of one or more passages of text occurring respectively in each document identified by the search results, a count of matching answer types of the one or more answer types associated with the particular question type, wherein an answer type is a matching answer type for a passage of text whenever one or more respective answer elements belonging to the answer type each occur in the passage of text;

computing a respective score for each passage of text of one or more passages of text occurring in each document identified by the search results, wherein the respective score for each passage of text is based the respective computed count of matching answer types for the passage of text;

determining that a computed score for a first passage of text occurring in a first document identified by a first search result satisfies a threshold; and in response, providing, in response to the query, a presentation that includes the first passage of text from the first document identified by the first search result.

* * * * *

UNITED STATES PATENT AND TRADEMARK OFFICE
CERTIFICATE OF CORRECTION

PATENT NO. : 10,592,540 B2
APPLICATION NO. : 15/195364
DATED : March 17, 2020
INVENTOR(S) : Liu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this
Twenty-fourth Day of November, 2020

Andrei Iancu
*Director of the United States Patent and Trademark Office*